(12) United States Patent
Yang et al.

(10) Patent No.: US 8,711,583 B2
(45) Date of Patent: Apr. 29, 2014

(54) SINGLE-STAGE PFC CONVERTER WITH CONSTANT VOLTAGE AND CONSTANT CURRENT

(75) Inventors: Ta-Yung Yang, Milpitas, CA (US); Jhih-Da Hsu, Sindian (TW); Ying-Chieh Su, Sijhih (TW); Li Lin, Taipei (TW)

(73) Assignee: System General Corporation, Sindian, Taipei County (TW)

( * ) Notice: Subject to any disclaimer, the term of this patent is extended or adjusted under 35 U.S.C. 154(b) by 218 days.

(21) Appl. No.: 13/182,291

(22) Filed: Jul. 13, 2011

(65) Prior Publication Data

US 2012/0170330 A1 Jul. 5, 2012

Related U.S. Application Data

(60) Provisional application No. 61/429,640, filed on Jan. 4, 2011.

(51) Int. Cl.
*H02M 3/335* (2006.01)

(52) U.S. Cl.
USPC .......... 363/21.13; 363/21.18; 363/97

(58) Field of Classification Search
USPC .......... 363/21.04, 21.08, 21.09, 21.12, 21.16, 363/21.17, 21.18, 97
See application file for complete search history.

(56) References Cited

U.S. PATENT DOCUMENTS

| | | | | |
|---|---|---|---|---|
| 6,900,623 | B2 * | 5/2005 | Yang et al. | 323/282 |
| 7,075,806 | B2 * | 7/2006 | Ichikawa et al. | 363/97 |
| 8,098,506 | B2 * | 1/2012 | Saint-Pierre | 363/97 |
| 2006/0077697 | A1 * | 4/2006 | Yang | 363/21.13 |
| 2010/0271849 | A1 * | 10/2010 | Grant et al. | 363/21.15 |

* cited by examiner

*Primary Examiner* — Nguyen Tran
(74) *Attorney, Agent, or Firm* — McClure, Qualey & Rodack, LLP

(57) ABSTRACT

An exemplary embodiment of a power converter is provided. The power converter includes a transformer, a power device, a switching controller, and a capacitor. The power device is coupled to the transformer for switching the transformer to product output of the power converter. The switching controller receives a feedback signal for generating a switching signal coupled to drive the power device. An input circuit of the switching controller is coupled to the transformer to sample an input signal for generating the feedback signal, and the input signal is correlated to the output of the power converter. The capacitor is coupled to the switching controller to provide frequency compensation for a feedback loop of the power converter. Input of the power converter is without an electrolytic capacitor, and a maximum output current of the power converter is a constant current.

15 Claims, 10 Drawing Sheets

US 8,711,583 B2

SINGLE-STAGE PFC CONVERTER WITH CONSTANT VOLTAGE AND CONSTANT CURRENT

CROSS REFERENCE TO RELATED APPLICATIONS

This application claims the benefit of U.S. Provisional Application No. 61/429,640, filed on Jan. 4, 2011, the contents of which are incorporated herein by reference.

BACKGROUND OF THE INVENTION

1. Field of the Invention

The invention relates to a single stage power factor correction (PFC) converter, and more particularly to a single stage PFC converter with constant voltage and constant current output for power supply, battery charger and LED lighting driver, etc.

2. Description of the Related Art

FIG. 1 shows a prior art of an offline power converter. The offline power converter comprises a transformer 10, a power transistor 20, a resistor 30, an input bridge-rectifier 35, a diode 41, a high input electrolytic capacitor 43, a capacitor 45, a switching controller 100, resistors 51 and 52, a diode 60, and a capacitor 65. The transformer 10 includes a primary winding $N_P$, an auxiliary winding $N_A$, and a secondary winding $N_S$. The high input electrolytic capacitor 43 is used for the energy storage. Waveforms of an input line voltage $V_{AC}$, an input line current $I_{AC}$, and an input voltage $V_{IN}$ in FIG. 1 are shown in FIG. 2. The input voltage $V_{IN}$ is the voltage on the high input electrolytic capacitor 43. The high capacitance input capacitor 43 will cause distortion of the input line current $I_{AC}$ and generate poor power factor (PF). Therefore, the capacitance of the high input electrolytic capacitor 43 must be reduced to improve the power factor. However, having no input capacitor with high capacitance will produce a low input voltage $V_{IN}$. The low voltage of the input voltage $V_{IN}$ will cause feedback open loop for the offline power converter. An output voltage $V_O$ of the offline power converter can be expressed as, $$V_O = N \times V_{IN} \times \frac{T_{ON}}{T - T_{ON}} \quad (1)$$

where N represents a turn ratio of the transformer 10 ($N=N_S/N_P$; $N_P$ is the primary winding, and $N_S$ is the secondary winding); $V_{IN}$ represents the input voltage of the transformer 10 (also the voltage on the high input electrolytic capacitor 43); $T_{ON}$ represents on-time of a switching signal $S_W$ which controls the power transistor 20; T represents a switching period of the power transistor 20.

In order to achieve a stable feedback loop and prevent transformer saturation, the maximum duty cycle "$T_{ON}/T$" is limited, such as <80% in general. If the input voltage $V_{IN}$ is too low, the maximum on-time $T_{ON}$ of the switching signal $S_W$ will be unable to maintain the regulated output voltage $V_O$ (shown in equation (1)) and cause the feedback open loop. When the feedback loop is significantly on/off (close-loop and open-loop) in response to the change of the input line voltage $V_{AC}$, an overshoot and/or undershoot signal can be easily generated at the output of the power converter. Besides, the input capacitor 43 is an electrolytic capacitor that is bulky and has low reliability. The object of this invention is to improve the power factor of the power converter without the need of extra power factor correction (PFC) power stage. Another object of this invention includes eliminating the need of the input electrolytic capacitor for improving the reliability of the power converter and reducing the size and the cost of the power converter.

BRIEF SUMMARY OF THE INVENTION

An exemplary embodiment of a power converter is provided. The power converter comprises a transformer, a power device, a switching controller, and a capacitor. The power device is coupled to the transformer for switching the transformer to product output of the power converter. The switching controller receives a feedback signal for generating a switching signal coupled to drive the power device. An input circuit of the switching controller is coupled to the transformer to sample an input signal for generating the feedback signal, and the input signal is correlated to the output of the power converter. The capacitor is coupled to the switching controller to provide frequency compensation for a feedback loop of the power converter. Input of the power converter is without an electrolytic capacitor, and a maximum output current of the power converter is a constant current.

Another exemplary embodiment of a power supply circuit is provided. The power supply circuit comprises a bridge rectifier, a transformer, a power device, a switching controller, and a capacitor. The bridge rectifier is coupled to input of the power supply circuit. The transformer is coupled to the bridge rectifier. The power device is coupled to the transformer for switching the transformer to product output of the power supply circuit. The switching controller receives a feedback signal for generating a switching signal coupled to drive the power device. An input circuit of the switching controller is coupled to the transformer to sample an input signal for generating the feedback signal, and the input signal is correlated to the output of the power supply circuit. The capacitor is coupled to the switching controller to provide frequency compensation for a feedback loop of the power supply circuit. The bridge rectifier is developed by high speed diodes, output of the bridge rectifier is without an electrolytic capacitor, and a maximum output current of the power supply circuit is a constant current.

The object of this invention is to improve a power factor of a power converter without a requirement of an extra PFC power stage.

Another object of this invention includes elimination of a requirement of an input electrolytic capacitor for improving the reliability of the power converter and reducing the size and the cost of the power converter.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention provides a single stage power factor correction (PFC) converter with a constant voltage and a constant current output for power supply circuit, battery charger and LED lighting driver, etc. The single stage PFC converter provides a high power factor (PF). In an embodiment, the single stage PFC power converter can be an offline or no-isolated power converter. Flyback power conversion with primary side regulation is used for the output voltage and the output current regulation.

Figure 1:
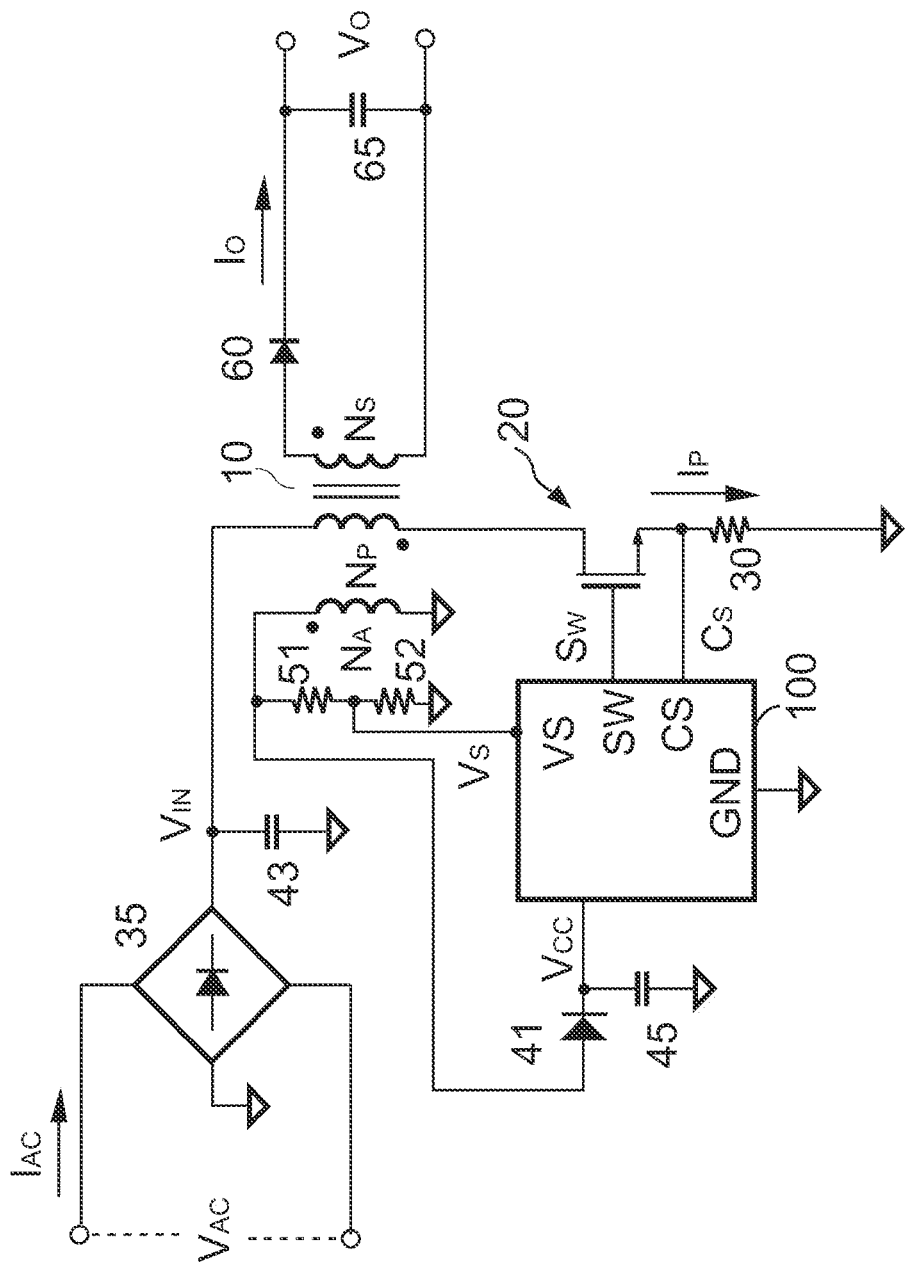
FIG. 1 shows a prior art of an offline power converter.
Figure 2:
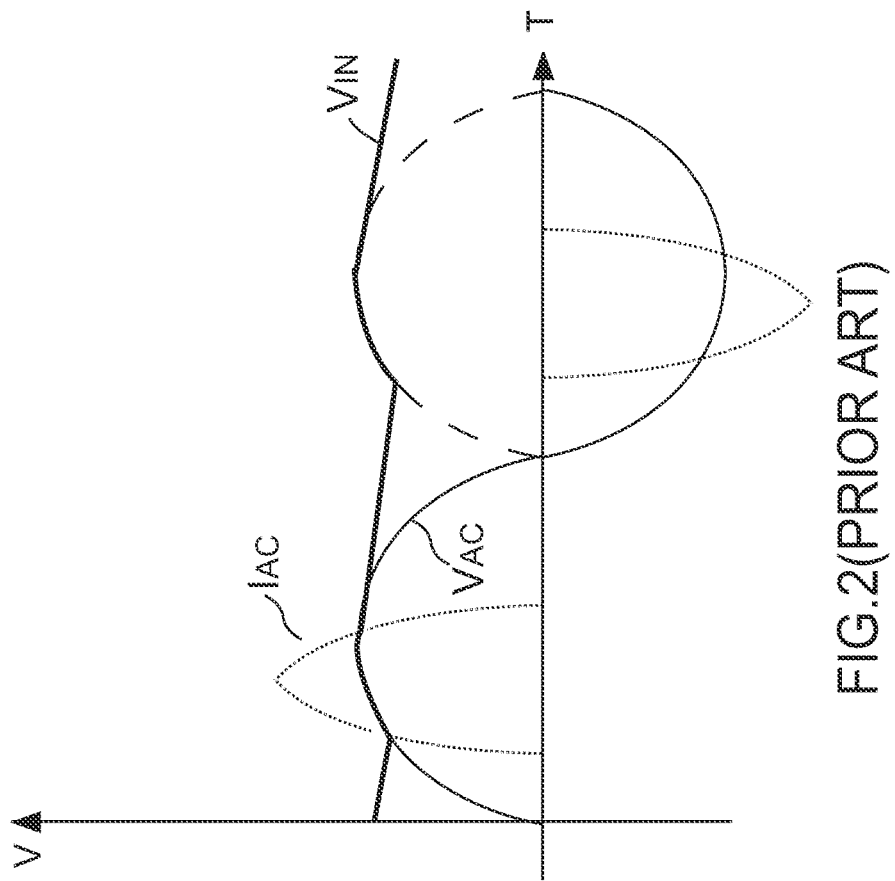
FIG. 2 shows waveforms of an input line voltage $V_{AC}$, an input line current $I_{AC}$, and an input voltage $V_{IN}$ of FIG. 1.
Figure 3:
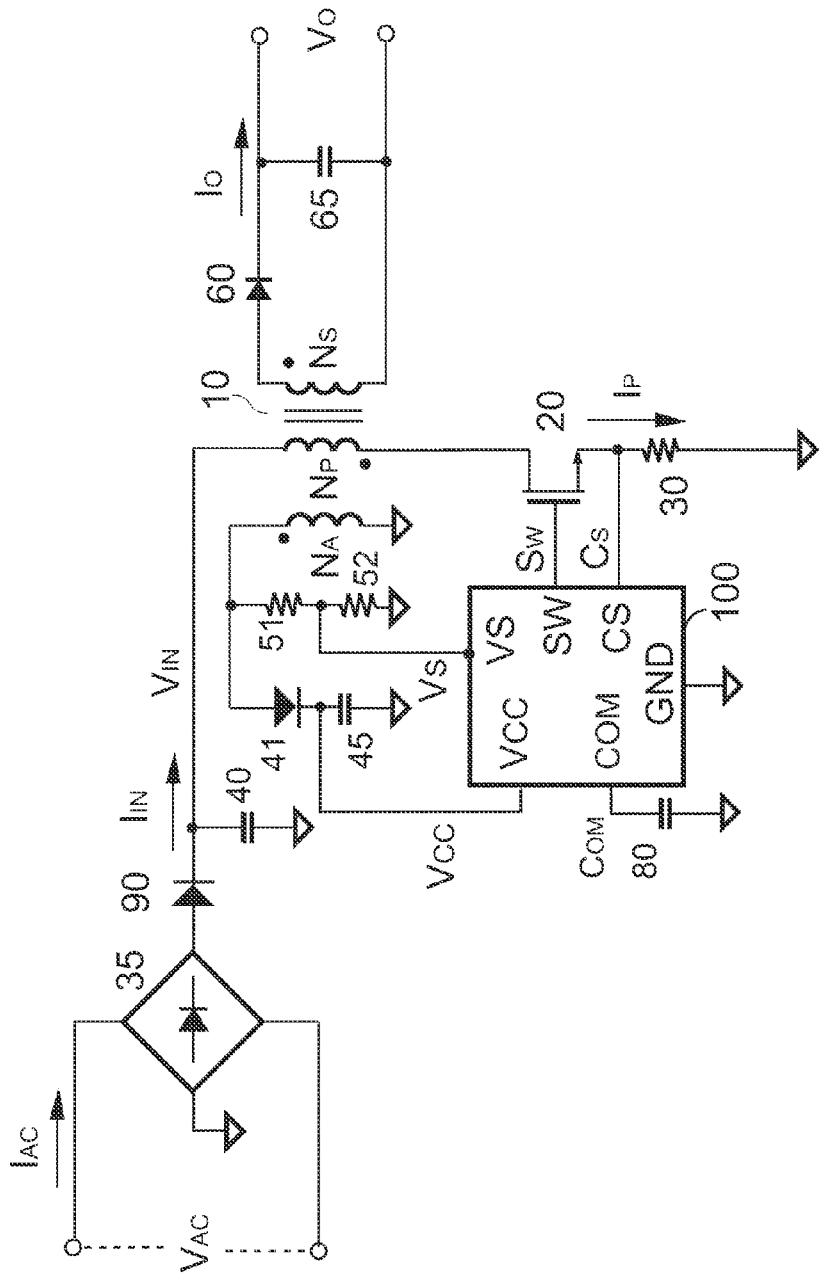
FIG. 3 is an exemplary embodiment of a power converter.

FIG. 3 is an exemplary embodiment of a power converter. The power converter is implemented based on the primary-side controlled power converter. The detail description of the primary-side controlled power converter can be found in the prior arts of an U.S. Pat. No. 6,977,824 titled "Control circuit for controlling output current at the primary side of a power converter", an U.S. Pat. No. 7,016,204 titled "Close-loop PWM controller for primary-side controlled power converters", an U.S. Pat. No. 7,349,229 titled "Causal sampling circuit for measuring reflected voltage and demagnetizing time of transformer", and U.S. Pat. No. 7,486,528 titled "Linear-predict sampling for measuring demagnetized voltage of transformer". For a multi-vector error amplifier, the related prior arts include U.S. Pat. No. 6,900,623 titled "Power supply having multi-vector error amplifier for power factor correction". Referring to the power factor correction, the skill has been disclosed in the prior art of U.S. Pat. No. 7,116,090 titled "Switching control circuit for discontinuous mode PFC converters" and U.S. Pat. No. 6,952,354 titled "Single stage PFC power converter".

A transformer 10 includes a primary winding $N_P$, an auxiliary winding $N_A$, and a secondary winding $N_S$. The primary winding $N_P$ is coupled to receive an input voltage $V_{IN}$. Resistors 51 and 52 are connected to the auxiliary winding $N_A$ for generating a voltage-sense signal $V_S$ coupled to a switching controller 100. In the embodiment, the switching controller 100 is a primary-side controlled circuit. The switching controller 100 generates a switching signal $S_W$ coupled to switch the transformer 10 through a power transistor 20 (power device), and accordingly, an output current $I_O$ and an output voltage $V_O$ (output signal) are generated through a diode 60 and a capacitor 65. When the power transistor 20 is turned on, a switching current $I_P$ will flow through the transformer 10. Via a resistor 30, the switching current $I_P$ further generates a current-sense signal $C_S$ coupled to the switching controller 100. A capacitor 80 provides a low-frequency-bandwidth frequency compensation for a feedback loop of the power converter. In order to achieve a high PF value, the low bandwidth of the feedback loop is required to be lower than line frequency (<50/60 Hz). Furthermore, this low bandwidth feedback loop determined by the capacitor 80 also prevents the output of the power converter from being unstable when the input voltage $V_{IN}$ is lower than the threshold that shown in equation (1).

A diode 41 and a capacitor 45 are coupled to the auxiliary winding $N_A$ to generate a power source $V_{CC}$ for the switching controller 100. Input of an input bridge-rectifier 35 is coupled to a line input of the power converter for receiving an input line voltage $V_{AC}$ and the input line current $I_{AC}$. A small capacitor 40, such as <1 uF capacitance, is coupled to output of the input bridge-rectifier 35 for providing a filter and achieving better EMI. The input bridge-rectifier 35 is normally formed by high-voltage and low-speed rectifiers. The switching frequency of the power converter is >20 kHz in general. A high-speed diode 90, e.g. its reverse-recovery time $T_{RR}$ is <500 nsec, is coupled between the input bridge-rectifier 35 and the capacitor 40. The high-speed diode 90 is utilized to prevent a reverse switching current of the transformer 10 from being output to the line input of the power converter, and therefore achieve a better PF value and EMI.

Figure 4:
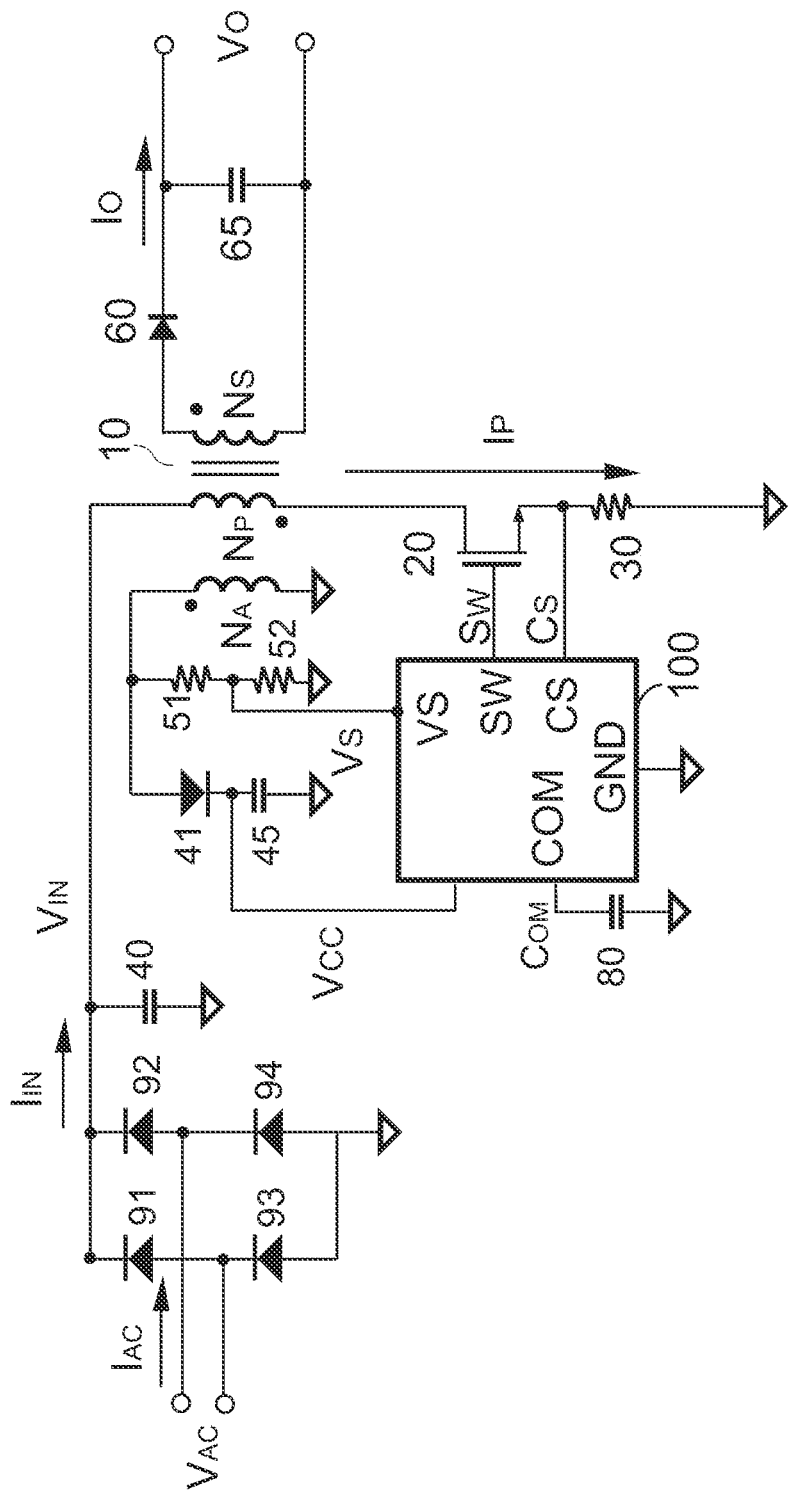
FIG. 4 is another exemplary embodiment of a power converter.

FIG. 4 is another exemplary embodiment of a power converter. In FIGS. 3 and 4, the same reference signs represent the same elements, and thus, the description about the same elements is omitted here. The difference between the embodiments of FIGS. 3 and 4 is that the power converter in the embodiment of FIG. 4 comprises high-speed diodes 91, 92, 93, and 94 in place of the input bridge-rectifier 35 in the embodiment of FIG. 3.

Figure 5:
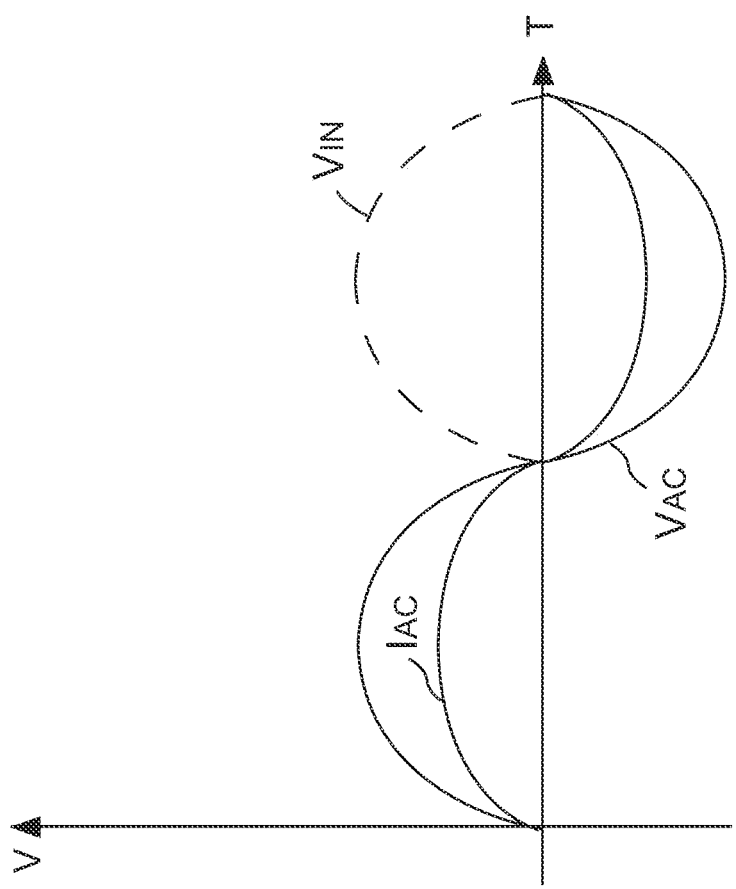
FIG. 5 shows the waveforms of the input line voltage $V_{AC}$, input line current $I_{AC}$, and the input voltage $V_{IN}$ in the power converters of FIG. 3 and FIG. 4.

FIG. 5 shows the waveforms of the input line voltage $V_{AC}$, the input line current $I_{AC}$, and the input voltage $V_{IN}$ in the embodiments of FIG. 3 and FIG. 4. Referring to FIG. 5, the input line current $I_{AC}$ follows the input line voltage $V_{AC}$, which achieves a good PF value and low THD (total harmonic distortion).

Figure 6:
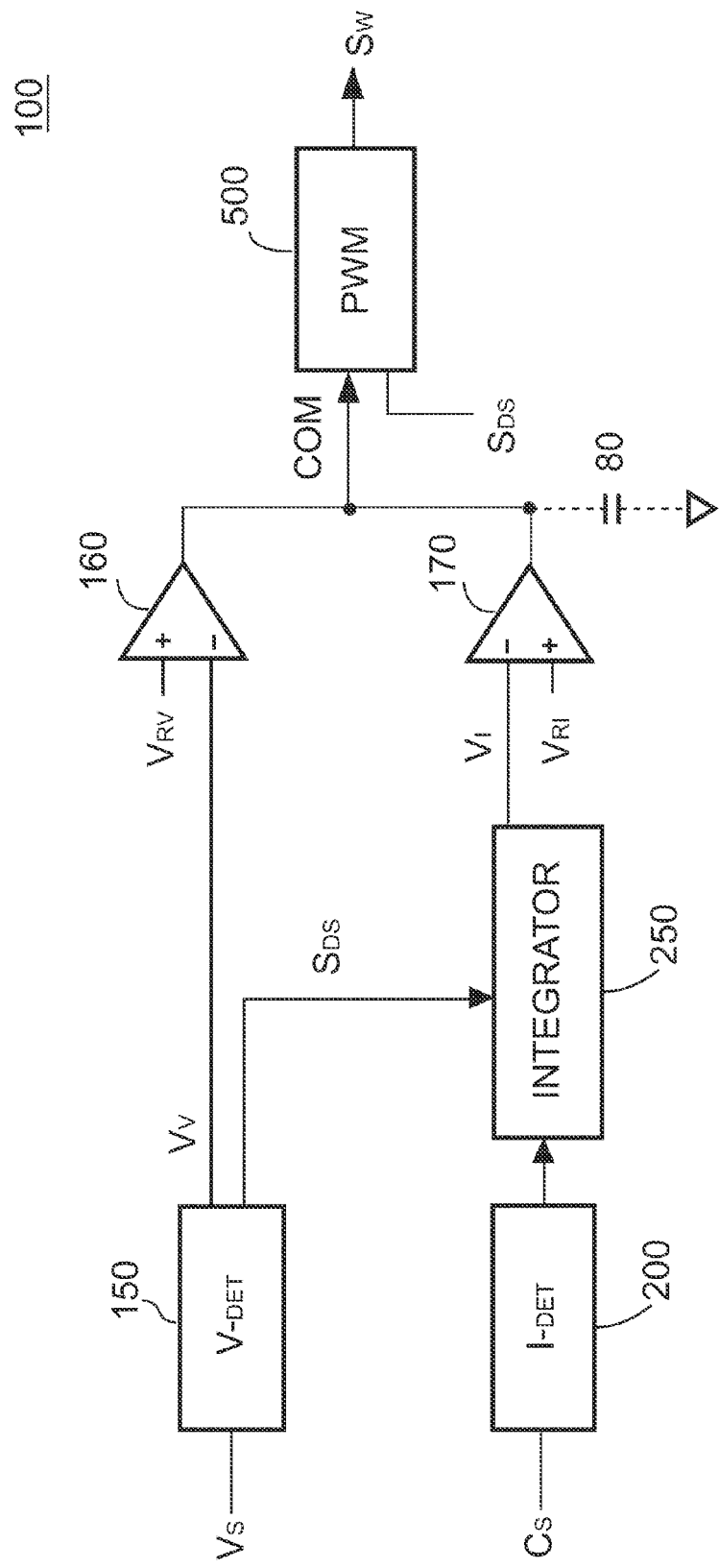
FIG. 6 is an exemplary embodiment of a switching controller in the power converters of FIG. 3 and FIG. 4.

FIG. 6 is an exemplary embodiment of the switching controller 100. An input circuit of the switching controller 100 is coupled to the transformer 10 to sample the voltage-sense signal $V_S$ and the current-sense signal $C_S$ which represent an input signal collectively. The input circuit comprises a voltage-detection circuit (V-$_{DET}$) 150 and a current-detection circuit (I-$_{DET}$) 200. The voltage-detection circuit 150 is connected to the voltage-sense signal $V_S$ to generate a voltage-feedback signal $V_V$ and a demagnetizing-time signal $S_{DS}$. The voltage-feedback signal $V_V$ is coupled to an error amplifier 160 to compare with a reference signal $V_{RV}$. The current-detection circuit 200 is coupled to receive the current-sense signal $C_S$ to generate a current-feedback signal $V_I$ through an integrator 250 in accordance with the current-sense signal $C_S$ and the demagnetizing-time signal $S_{DS}$. The current-feedback signal $V_I$ is further coupled to an error amplifier 170 to compare with a reference signal $V_{RI}$. Both the error amplifiers 160 and 170 are transconductance amplifiers or multi-vector error amplifiers for achieving better dynamic transit response. The output of the error amplifiers 160 and 170 are coupled to the capacitor 80 for generating a compensated signal $C_{OM}$ coupled to a PWM circuit (PWM) 500 to generate the switching signal $S_W$ according to the compensated signal $C_{OM}$ and the demagnetizing-time signal $S_{DS}$. When the output current $I_O$ of the power converter is higher than its maximum level, the output current $I_O$ will be a constant current for driving a load (not shown). Thus, the switching signal $S_W$ is controlled by the current-feedback signal $V_I$ and the compensated signal $C_{OM}$ to achieve a constant output current $I_O$. When the output current $I_O$ of the power converter is lower than its maximum level, the voltage-feedback signal $V_V$ and the compensated signal $C_{OM}$ will be utilized to regulate the maximum output voltage $V_O$. As the described above, the input signal is correlated to the output of the power converter. Therefore, in order to achieve a high PF value, the compensated signal is developed to provide a "constant on-time" for the switching signal $S_W$ during the period of line frequency. Thus, the bandwidth of the feedback loop should be lower than the line frequency. The line frequency is 50 or 60 Hz in general.

Figure 7:
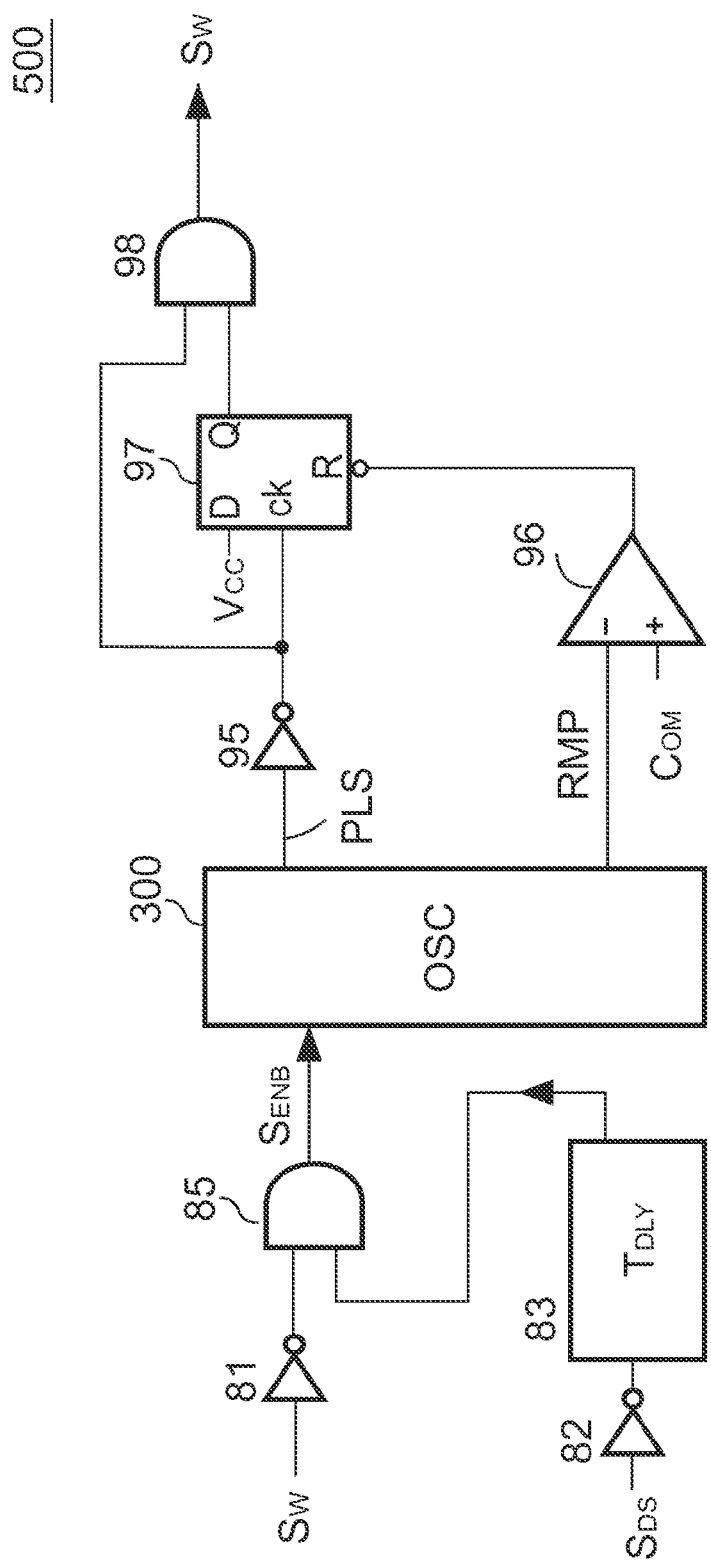
FIG. 7 shows an exemplary embodiment of a PWM circuit in the switching controller of FIG. 6.

FIG. 7 is an exemplary embodiment of the PWM circuit 500. A signal generation circuit 300 generates a pulse signal PLS to turn on the switching signal $S_W$ through an inverter 95, a flip-flop 97, and an AND gate 98. In the embodiment, the signal generation circuit 300 is an oscillator (OSC). The signal generation circuit 300 further generates a ramp signal RMP coupled to a comparator 96 to compare with the compensated signal $C_{OM}$ for turning off the switching signal $S_W$. The signal generation circuit 300 generates the pulse signal PLS in response to an enable signal $S_{ENB}$ to achieve a "boundary current mode (BCM) operation" for the power conversion. The BCM operation will help to improve the PF. The enable signal $S_{ENB}$ is generated according to the switching signal $S_W$ and the demagnetizing-time signal $S_{DS}$. The demagnetizing-time signal $S_{DS}$ is coupled to generate the enable signal $S_{ENB}$ through an inverter 82, a delay circuit 83 and an AND gate 85. The switching signal $S_W$ is coupled to generate the enable signal $S_{ENB}$ through an inverter 81 and the AND gate 85. The enabling of the demagnetizing-time signal $S_{DS}$ means that the transformer 10 is fully demagnetized.

Figure 8:
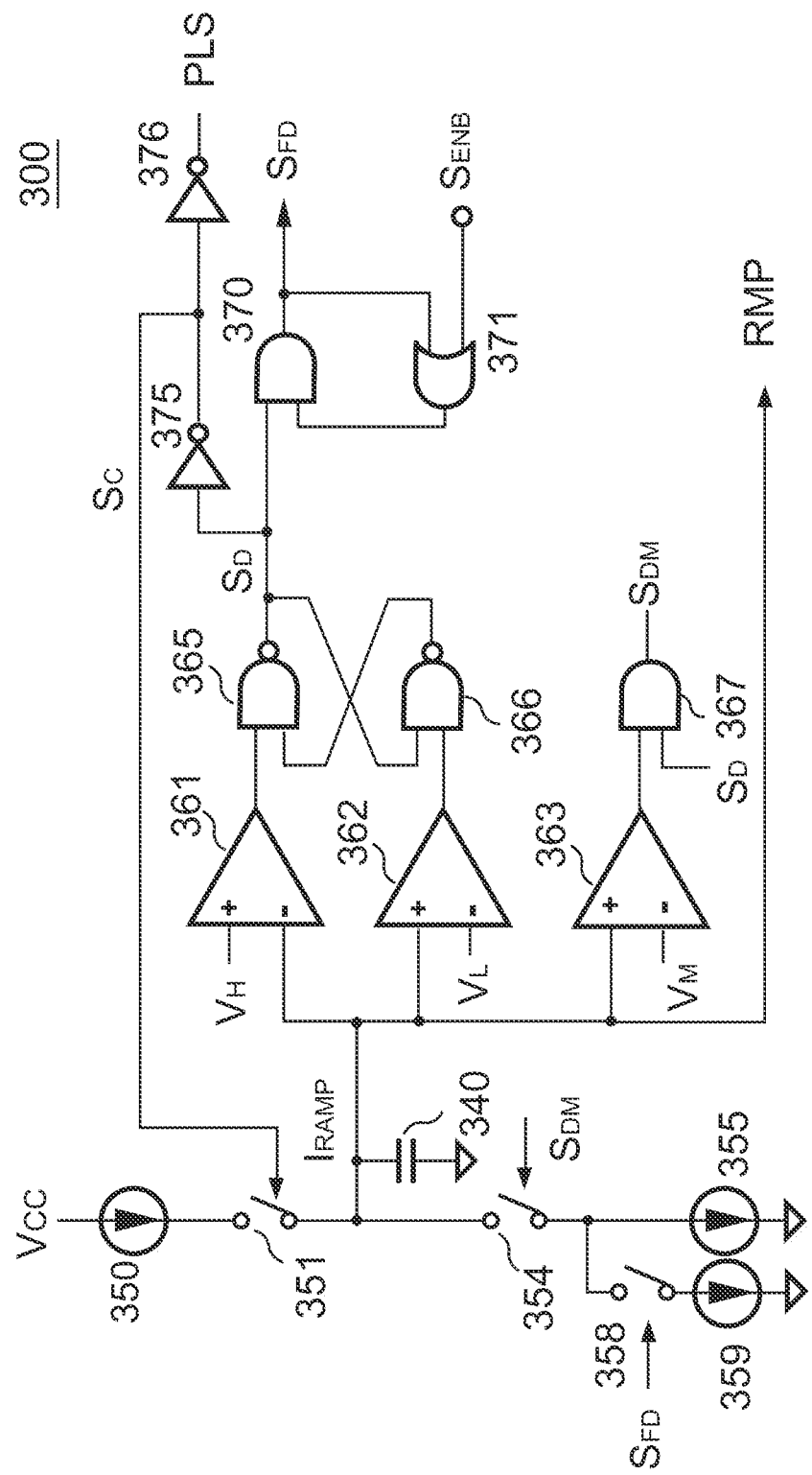
FIG. 8 shows an exemplary embodiment of a signal generation circuit in the PWM circuit of FIG. 7.

FIG. 8 shows an exemplary embodiment of the signal generation circuit 300. A current source 350 is coupled to charge a capacitor 340 through a switch 351. A current source 355 is coupled to discharge the capacitor 340 through a switch 354 due to the current of the current source 355. The switch 351 is controlled by a charge signal $S_C$. The switch 354 is controlled by a discharge signal $S_{DM}$. The capacitor 340 thus generates a ramp signal $I_{RAMP}$ (that is the ramp signal RMP) coupled to comparators 361, 362 and 363. The comparator 361 has a threshold $V_H$. The comparator 362 has a threshold $V_L$. The comparator 363 has a threshold $V_M$, and the levels of the thresholds are $V_H > V_M > V_L$. NAND gates 365 and 366 form a latch circuit coupled to receive output signals of the comparators 361 and 362. The latch circuit outputs a discharge signal $S_D$. The discharge signal $S_D$ is a maximum frequency signal. The discharge signal $S_D$ and an output signal of the comparator 363 are connected to an AND gate 367 for generating the discharge signal $S_{DM}$.

The discharge signal $S_D$ is also connected to an inverter 375 to generate the charge signal $S_C$. The charge signal $S_C$ is connected to an inverter 376 to generate the pulse signal PLS. The pulse signal PLS is generated during the discharge period of the capacitor 340. The discharge signal $S_D$ is further coupled to an input of an AND gate 370 to generate a fast-discharge signal $S_{FD}$. The fast-discharge signal $S_{FD}$ and the enable signal $S_{ENB}$ are connected to an OR gate 371. The output of the OR gate 371 is connected to another input of the AND gate 370. Therefore, the enable signal $S_{ENB}$ will trigger the fast-discharge signal $S_{FD}$ once the discharge signal $S_D$ is enabled. The fast-discharge signal $S_{FD}$ can be turned off only when the discharge signal $S_D$ is disabled. A current source 359 is connected to the switch 358. The switch 358 is controlled by the fast-discharge signal $S_{FD}$. Since the current of the current source 359 is high, the capacitor 340 will be immediately discharged when the fast-discharge signal $S_{FD}$ is enabled. During the discharge period, the ramp signal $I_{RAMP}$ is hold at the level of the threshold $V_M$ until the enable signal $S_{ENB}$ starts the fast-discharge signal $S_{FD}$. Once the capacitor 340 is discharged lower than the threshold $V_L$, the discharge signal $S_D$ will be disabled.

The demagnetizing-time signal $S_{DS}$ is thus able to trigger the pulse signal PLS once the discharge signal $S_D$ is enabled. Therefore, the switching control of the power conversion can be operated in a BCM. The current of the current source 350, the capacitance of the capacitor 340, and the thresholds $V_H$, $V_M$, and $V_L$ determine the maximum frequency of the discharge signal $S_D$ and determine the maximum frequency of the switching signal $S_W$.

Figure 9:
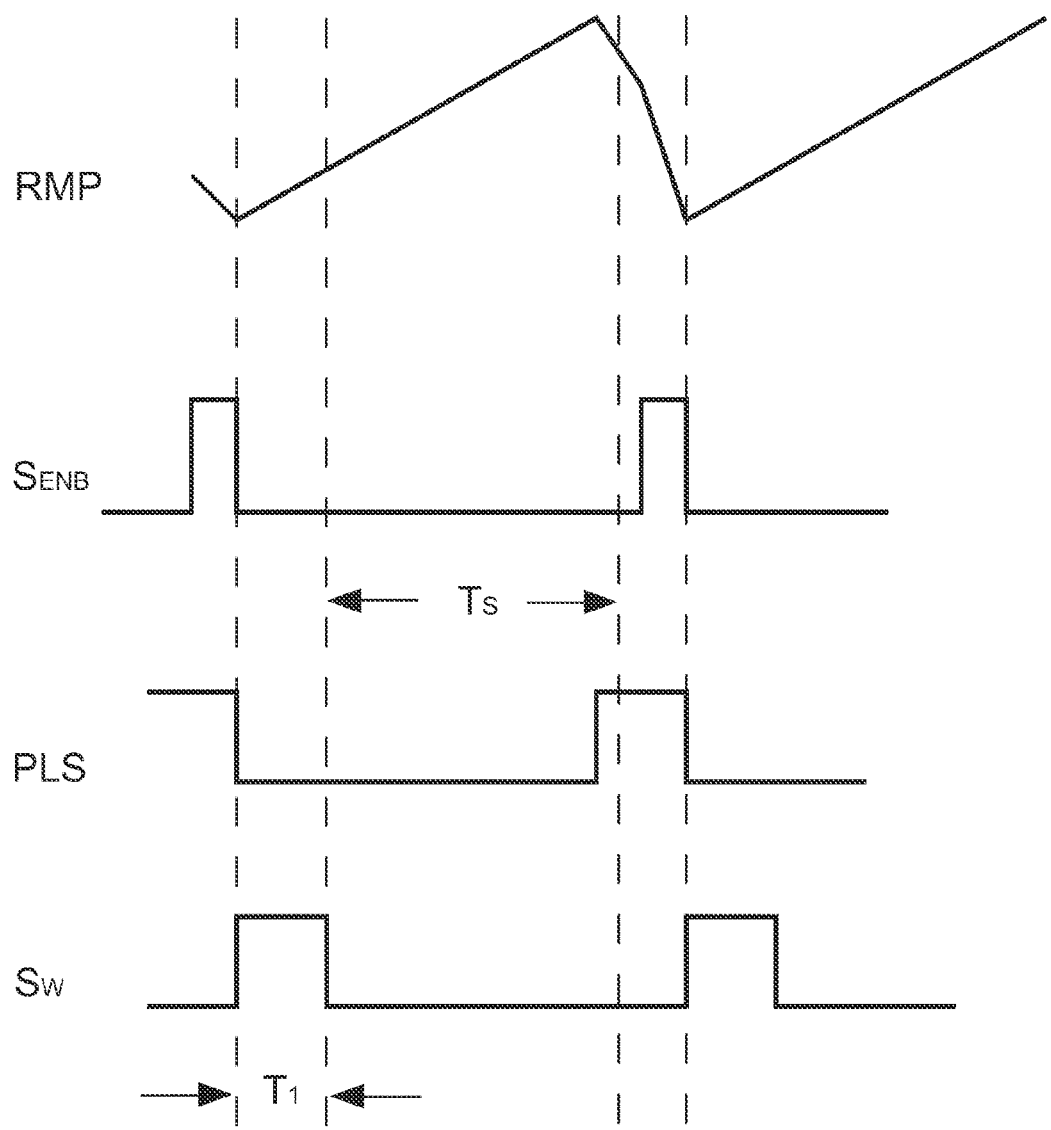
FIG. 9 shows a switching signal in the power converters of FIG. 3 and FIG. 4 when the switching signal is operated in BCM.

FIG. 9 shows the switching signal $S_W$ operated at a BCM. The switching signal $S_W$ is turned on at a period $T_1$. The period $T_S$ shows the demagnetizing time of the transformer 10. The demagnetizing time $T_S$ is correlated to the demagnetizing-time signal $S_{DS}$.

Figure 10:
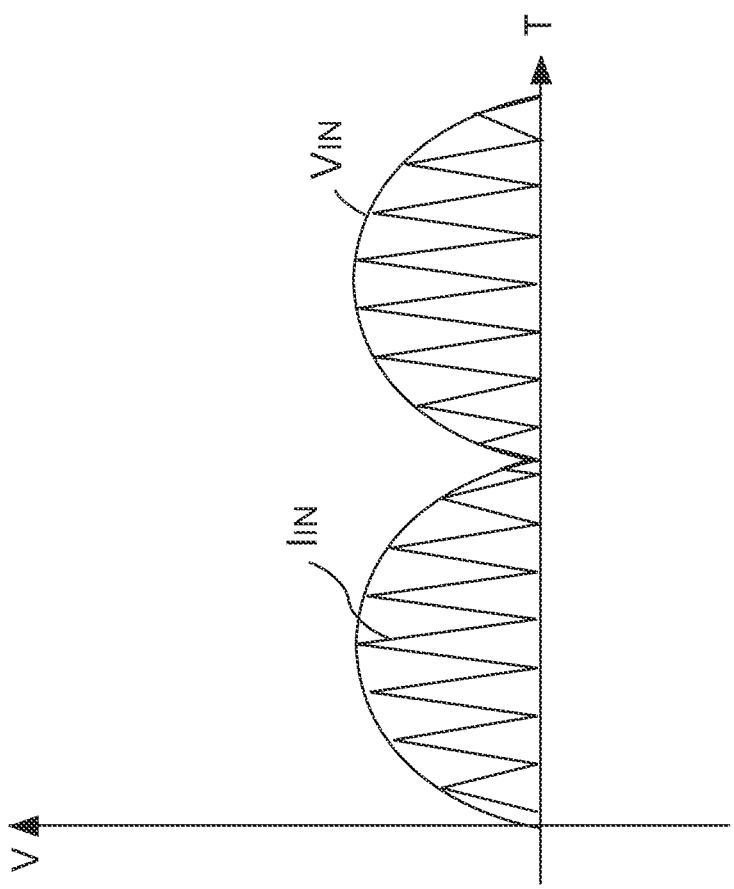
FIG. 10 shows waveforms of an input voltage and an input current in the power converters of FIG. 3 and FIG. 4 when switching signal is operated in BCM.

FIG. 10 shows the waveforms of the input voltage $V_{IN}$ and an input current $I_{IN}$ when the switching signal $S_W$ is operated at a BCM.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power converter comprising:

a transformer;

a power device coupled to the transformer for switching the transformer to product an output of the power converter;

a switching controller receiving a feedback signal for generating a switching signal coupled to drive the power device, wherein an input circuit of the switching controller is coupled to the transformer to sample an input signal for generating the feedback signal, and the input signal is correlated to the output of the power converter; and a capacitor coupled to the switching controller to provide frequency compensation for a feedback loop of the power converter;

wherein an input of the power converter is without a electrolytic capacitor, and a maximum output current of the power converter is a constant current;

wherein the input circuit further generates a voltage-feedback signal and a demagnetizing-time signal according to the input signal, and enabling of the demagnetizing-time signal indicates that the transformer is fully demagnetized; and wherein the switching controller comprises:

an integrator generating a current-feedback signal according to the input signal and the demagnetizing-time signal;

a first error amplifier comparing the voltage-feedback signal with a first reference signal;

a second error amplifier comparing the current-feedback signal with a second reference signal, wherein outputs of the first and second error amplifiers are coupled to the capacitor to generate a compensated signal; and a PWM circuit receiving the compensated signal and the demagnetizing-time signal and generating the switching signal according to the compensated signal and the demagnetizing-time signal.

2. The power converter as claimed in claim 1, wherein an output voltage of the power converter is a constant voltage when an output current of the power converter is lower than a maximum value.

3. The power converter as claimed in claim 1, wherein bandwidth of the feedback loop is lower than a line frequency.

4. The power converter as claimed in claim 1, wherein the switching controller generates the switching signal operated in a boundary current mode (BMC).

5. The power converter as claimed in claim 1, wherein the integrator is for a constant current control.

6. The power converter as claimed in claim 1, wherein the first and second error amplifiers develop the feedback loop, and the first and second error amplifiers are multi-vector error amplifiers.

7. The power converter as claimed in claim 1 further comprising:
   a bridge-rectifier coupled to a line input of the power converter; and
   a high-speed diode coupled between the bridge-rectifier and the transformer.

8. The power converter as claimed in claim 1, wherein, the switching controller is a primary-side controlled circuit.

9. A power supply circuit comprising:
   a bridge rectifier coupled to input of the power supply circuit;
   a transformer coupled to the bridge rectifier;
   a power device coupled to the transformer for switching the transformer to product an output of the power supply circuit;
   a switching controller receiving a feedback signal for generating a switching signal coupled to drive the power device, wherein an input circuit of the switching controller is coupled to the transformer to sample an input signal for generating the feedback signal, and the input signal is correlated to the output of the power supply circuit; and
   a capacitor coupled to the switching controller to provide frequency compensation for a feedback loop of the power supply circuit;
   wherein the bridge rectifier is developed by high speed diodes, output of the bridge rectifier is without an electrolytic capacitor, and a maximum output current of the power supply circuit is a constant current;
   wherein the input circuit further generates a voltage-feedback signal and a demagnetizing-time signal according to the input signal, and enabling of the demagnetizing-time signal indicates that the transformer is fully demagnetized; and
   wherein the switching controller comprises:
   an integrator generating a current-feedback signal according to the input signal and the demagnetizing-time signal;
   a first error amplifier comparing the voltage-feedback signal with a first reference signal;
   a second error amplifier comparing the current-feedback signal with a second reference signal, wherein outputs of the first and second error amplifiers are coupled to the capacitor to generate a compensated signal; and
   a PWM circuit receiving the compensated signal and the demagnetizing-time signal and generating the switching signal according to the compensated signal and the demagnetizing-time signal.

10. The power supply circuit as claimed in claim 9, wherein an output voltage of the power supply circuit is a constant voltage when an output current of the power supply circuit is lower than a maximum value.

11. The power supply circuit as claimed in claim 9, wherein bandwidth of the feedback loop is lower than a line frequency.

12. The power supply circuit as claimed in claim 9, wherein the switching controller generates the switching signal operated in a boundary current mode (BMC).

13. The power supply circuit as claimed in claim 9, wherein the integrator is for a constant current control.

14. The power supply circuit as claimed in claim 9, wherein the first and second error amplifiers develop the feedback loop, and the first and second error amplifier are multi-vector error amplifiers.

15. The power supply circuit as claimed in claim 9, wherein reverse recovery time of the high-speed diodes is lower than 500 nsec.

* * * * *